June 24, 1930.  J. HAW  1,767,127
ADJUSTABLE PROPELLER
Filed Nov. 10, 1928  3 Sheets-Sheet 1

Inventor:
Jakob Haw
by Richard E. Babcock
Attorney

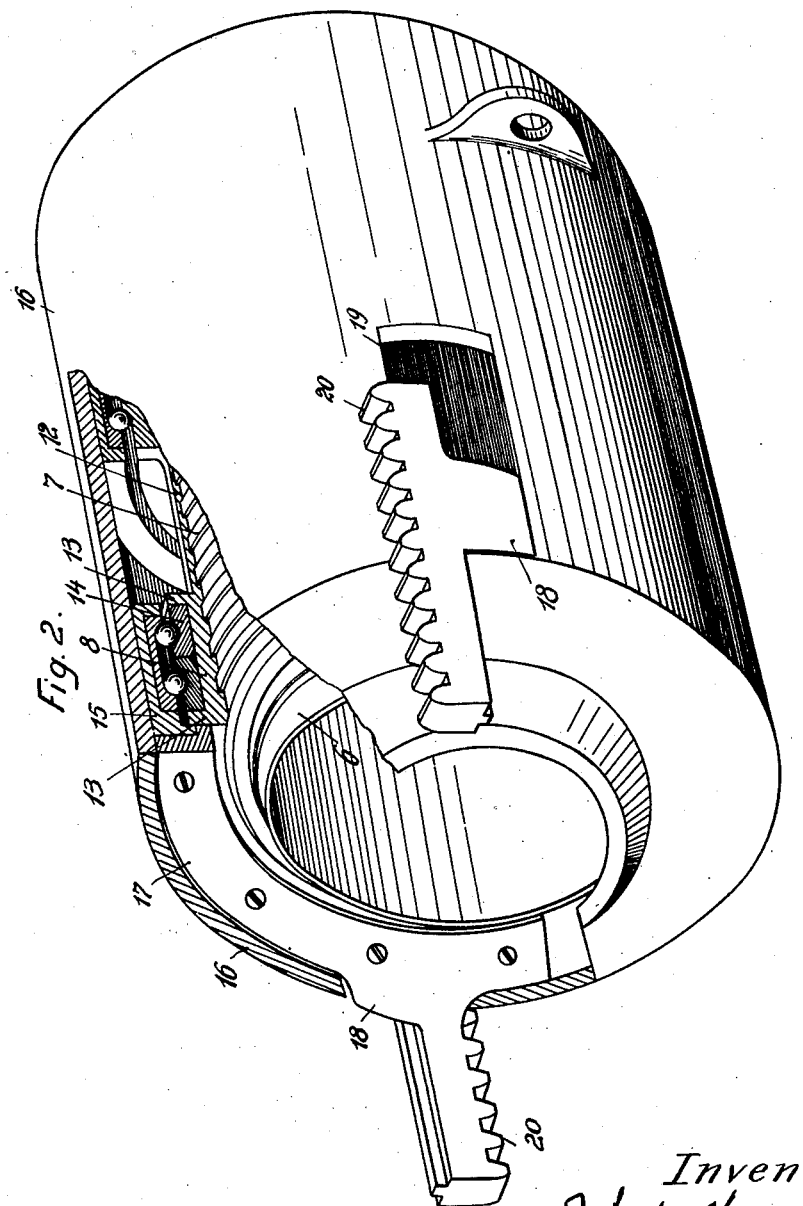

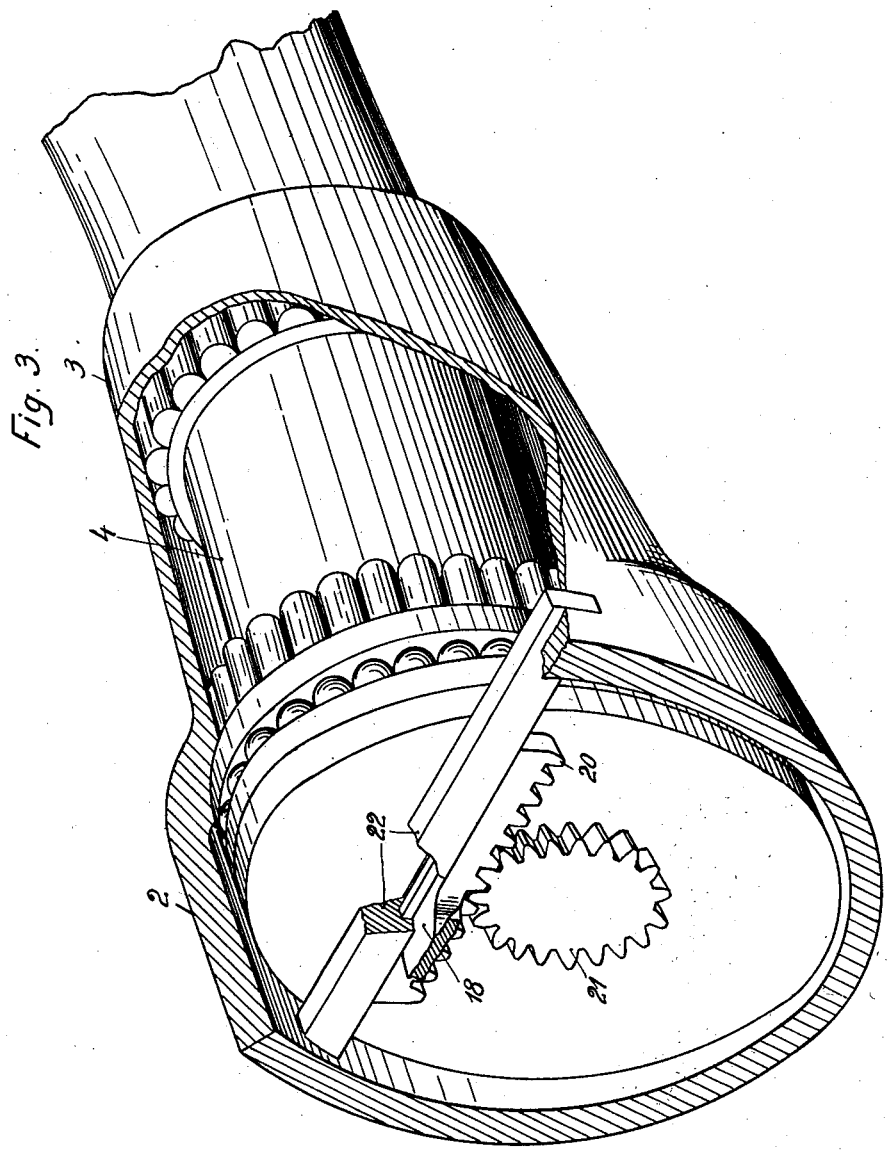

Patented June 24, 1930

1,767,127

UNITED STATES PATENT OFFICE

JAKOB HAW, OF BERLIN-STAAKEN, GERMANY

ADJUSTABLE PROPELLER

Application filed November 10, 1928, Serial No. 318,363, and in Germany November 12, 1927.

The present invention relates to propellers and more particularly of the type having blades which are adapted to turn about the longitudinal axis thereof and have a pitch which can be adjusted during rotation of the propeller by a movable sleeve arranged concentrically of the propeller shaft.

Usually in the known devices for the adjustment of propeller blades the elements which are prevented from rotation, and also those elements rotating with the propeller, are arranged on or adjacent the propeller boss and only the adjusting members engaging the rotating blades project partially into the boss or into the bearings in the base of the blades.

A number of inconveniences arise from this known arrangement of the adjusting devices adjacent the propeller for example among other things, a greater length is rendered necessary for the end of the propeller shaft which is not mounted in bearings.

This objection is overcome by the invention by arranging the movable sleeve itself, and also the devices provided for its mounting and adjustment, in the interior of the propeller boss or the bearings for the ends of the blades, in addition to the adjusting devices engaging directly on the blades. By this means the structural length of the propeller shaft is considerably reduced and, moreover, a reliable mounting and securing of all the components of the adjusting mechanism inside the propeller boss or the base members of the blades attached to the boss is obtained.

The adjusting mechanism arranged in the propeller boss is preferably constructed so that an internally threaded movable sleeve turns on an externally threaded bush rigidly secured to the aircraft body and projecting between the propeller shaft and the propeller boss into the latter.

The movable sleeve running on the thread of the fixed bush is coupled, so as to be longitudinally displaceable, with a setting wheel entraining it, which is preferably rotatably mounted on the end of the bush projecting from the boss.

In its logitudinal movement on the bush, the movable sleeve entrains the inner race of a ball bearing, the outer race of which, rotating with the propeller, is connected with the adjusting members engaging the separate blades. The adjustment of the blade is, according to the invention, carried out by means of the movable sleeve or racks entrained by the outer race of the said ball bearing which mesh with gears mounted on the pivotal axes in the base of the blades.

One form of construction of a two-bladed propeller for aircraft is shown by way of example in the drawings.

Figure 2 shows also diagrammatically the arrangement of the adjusting devices constructed as racks in the housing of the ball bearing moved by the movable sleeve.

Figure 3 is a diagrammatical view of the base of the blade mounted in the boss.

Figure 1:
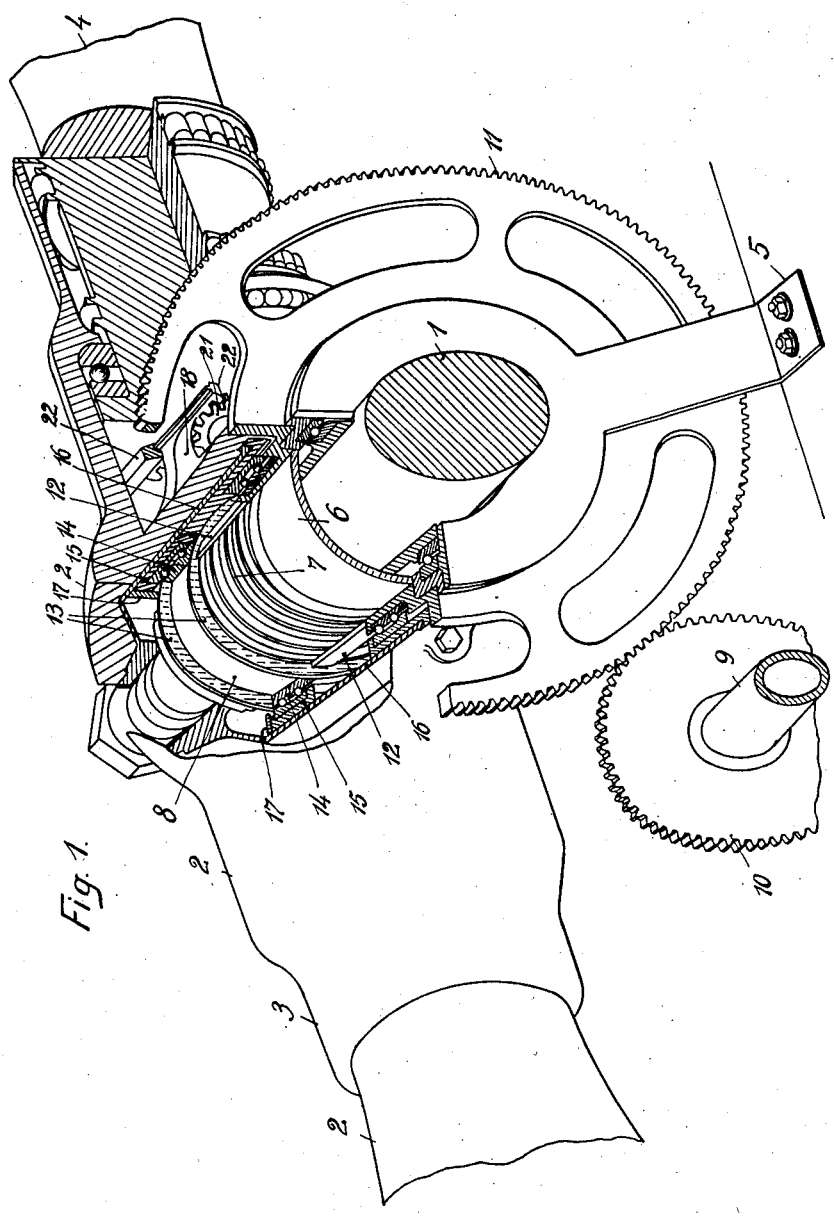
Figure 1 shows diagrammatically the propeller shaft with the propeller boss, shown partly in section, and the base members of the blades together with the adjusting mechanism arranged in the base.

The propeller boss 2 which merges into two bearing bushes 3 for the feet 4 of the blades which are pivotally mounted in the bushes 3 is mounted on the shaft 1 rotated by the engine. An annular space, open towards the driving side, is left between the shaft 1 and the propeller boss 2 into which projects a bush 6 rigidly connected by a strut 5 with the aircraft or the engine housing and thereby prevented from rotating. This bush is provided with an external thread 7 on which runs the internally threaded movable sleeve 8.

The displacement of the sleeve 8 can be effected from the pilot's seat, when the propeller is rotating, by rotation of the shaft 9 carrying the gear wheel 10. The gear wheel 11 running on the outer end of the bush 6 is slowly rotated by the gear wheel 10 and entrains the movable sleeve 8 by means of the rods 12, so that it travels to and fro along the bush 6 according to the rotation of the wheel 10.

The movable sleeve 8 is provided at both ends with annular flanges 13, between which are located the internal race of a ball bearing 14. The outer race of this ball bearing 14 is located in an annular sleeve 15, longitudinally displaceable in the cylindrical housing 16. The cylindrical housing 16 is mounted in the propeller boss 2 and rotates therewith as does also the annular sleeve 15 and the outer race of the ball bearing 14.

Two segments 17, carrying racks 20 on arms 18 projecting through slots 19 into the cylindrical housing 16, are screwed on to the end of the annular sleeve 15. The racks mesh with gears 21 mounted on the pivotal axes on the bases of the blades. In order to ensure meshing of the racks 20 with the gears 21, at least one rack 20 is supported on the side away from its corresponding gear wheel 21 by a guide rail 22 inserted transversely through the propeller boss 2.

On axial displacement of the sleeve 8 caused by rotation of the gear wheel 11, the annular sleeve 9 and consequently the racks 20, are displaced by means of the ball bearing 14, arranged so as to take up axial force, so that the gears 21 mounted on the two feet 4 of the blades are rotated in opposite directions and the pitch of the propeller blades can be altered as desired.

I declare that what I claim is:

In a propeller for aircraft, whose pivoted blades have an adjustable pitch, the combination of a bush rigidly mounted on the aircraft and having an externally threaded portion arranged between the propeller shaft and boss and projecting into the latter, a setting wheel rotatably mounted on the outer non-threaded end of said bush, an internally threaded movable sleeve concentric with the propeller shaft and coupled with the setting wheel, so as to be longitudinally displaceable and rotatable on the externally threaded portion of the bush, racks connected with the movable sleeve, so as to be entrained by the latter, and supported by guide rails inserted transversely through the propeller boss and, meshing with said racks, gears mounted on the pivotal axes of the feet of the blades.

In testimony whereof, I have signed my name to this specification at Berlin, Germany, this 30th day of October, 1928.

JAKOB HAW.